United States Patent
Böhm et al.

(10) Patent No.: US 6,908,136 B2
(45) Date of Patent: Jun. 21, 2005

(54) INNER SHELL FOR VEHICLE BODIES

(75) Inventors: Horst Böhm, Frankfurt (DE); Rainer Grimm, Frankfurt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/638,127

(22) Filed: Aug. 8, 2003

(65) Prior Publication Data

US 2004/0066054 A1 Apr. 8, 2004

(30) Foreign Application Priority Data

Aug. 9, 2002 (DE) .......................... 102 36 595

(51) Int. Cl.$^7$ .......................... B60R 13/01; B62N 3/02; B60J 3/02
(52) U.S. Cl. .................... 296/39.1; 296/1.02; 296/37.7; 296/37.8; 296/97.1; 296/214
(58) Field of Search ................. 296/39.1, 214, 296/37.8, 97.1, 97.5, 97.9, 1.02, 210, 97.4, 37.7

(56) References Cited

U.S. PATENT DOCUMENTS

| | | | |
|---|---|---|---|
| 3,953,067 A | * | 4/1976 | Isola .......................... 296/214 |
| 4,958,878 A | | 9/1990 | Kempkers |
| 5,269,060 A | | 12/1993 | Dowd et al. |
| 5,833,304 A | * | 11/1998 | Daniel et al. ................ 296/214 |
| 6,234,570 B1 | * | 5/2001 | Quinno et al. .............. 296/214 |
| 6,296,293 B1 | * | 10/2001 | Peterson et al. ......... 296/97.11 |
| 6,318,797 B1 | * | 11/2001 | Bohm et al. ................ 296/210 |
| 6,334,626 B2 | * | 1/2002 | Nakajima et al. ........ 280/730.2 |
| 6,367,871 B2 | * | 4/2002 | Grimm et al. .............. 296/210 |

FOREIGN PATENT DOCUMENTS

| | | |
|---|---|---|
| DE | 197 09 016 A1 | 9/1998 |
| DE | 197 41 265 C1 | 10/1998 |
| EP | 1 483 905 | 8/1977 |
| EP | 0 203 484 A2 | 12/1986 |

OTHER PUBLICATIONS

European Search Report, Feb. 20, 2004.

\* cited by examiner

*Primary Examiner*—D. Glenn Dayoan
*Assistant Examiner*—Gregg Blankenship
(74) *Attorney, Agent, or Firm*—Carlson, Gaskey & Olds

(57) ABSTRACT

An inner shell (10) for vehicle bodies molded from a foam plastic includes at least one flap (14) which can move optionally between a non-usage position to a usage position. Preferably the flap (14) serves as a sun visor, allows access to a function element or a cavity (16), or both. According to the invention the flap (14) is formed as a part of the inner shell (10) and in its non-usage position closes essentially surface-flush with the areas of the inner shell (10) adjacent to the flap (14).

16 Claims, 3 Drawing Sheets

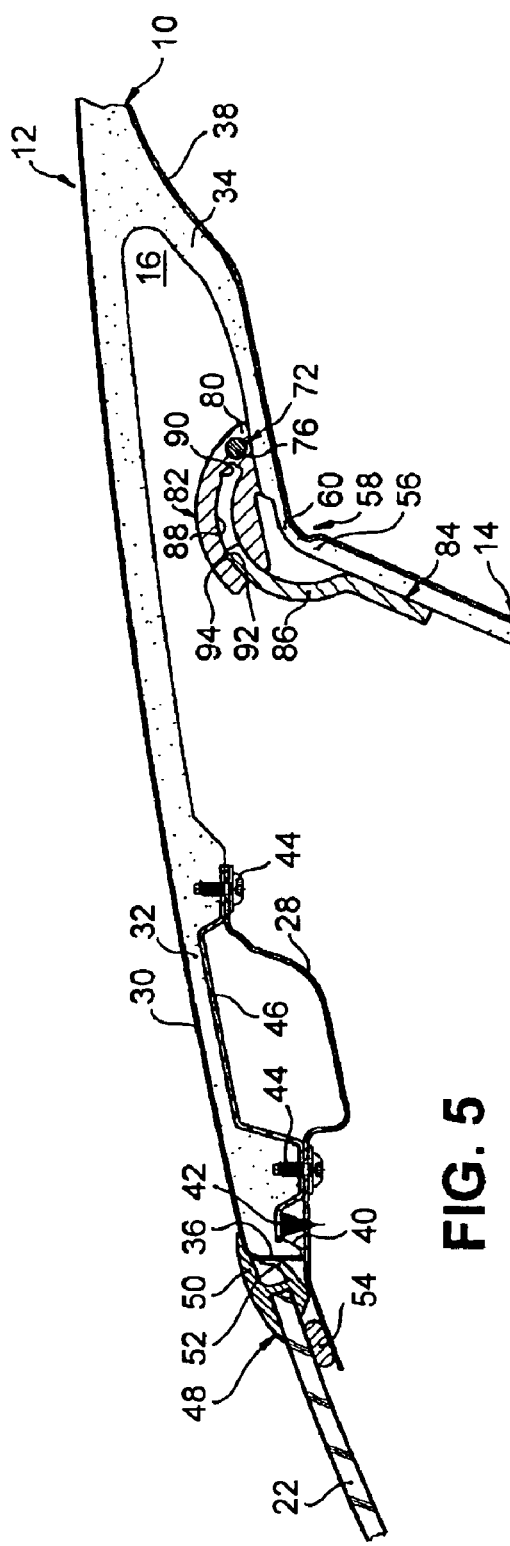
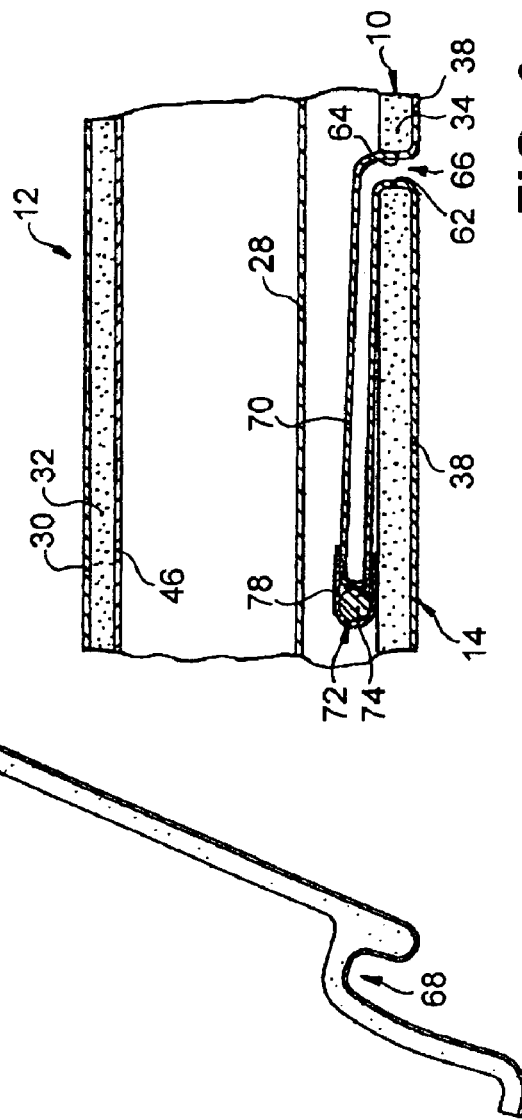
FIG. 5
FIG. 6

INNER SHELL FOR VEHICLE BODIES

BACKGROUND OF THE INVENTION

The present invention relates to an inner shelf or inner trim part for vehicle bodies. In particular, the invention relates to a vehicle body inner shell having at least one flap, which is useful as a sun visor, for example.

Known modular preproduced vehicle roofs ready for installation are produced separately from the vehicle body and only combined with the vehicle body on the assembly line in the factory. In particular, because of the substantial shortening of assembly times on the assembly line, such vehicle roof modules are gaining in importance in mass production.

The generic DE 199 59 812 A1 by the Applicant discloses a sun visor arrangement on a roof module for motor vehicles which, sandwich-like and formed on its inner shell made of foam plastic as a roof lining produced separately from the vehicle body, can be laid with its outer edges on the body frame and firmly connected to this. The inner shell in the area of its outer edges intended to rest on the body frame is divided into two layers, the upper layer of which can be laid on the body frame while the lower layer can be bent down and is designed to line the body frame. Furthermore, the lower layer in the area of the front crossbar of the body frame has premounted sun visors which are attached on swiveling mount elements connected with the lower layer. Through the mount elements can be guided fixing means which attach the mount elements and lower layer to the front crossbar of the body frame. In order to improve the premounting opportunities for sun visors to the inner shell and hence also the swiveling movement of the sun visors in order also to provide a rotary movement in each of the mounting elements, according to the state of the art for each sun visor a rotary bearing is foam-molded as a mount element in the lower layer of the inner shell and is designed to hold a bearing bolt with which the sun visor is connected swiveling outside the rotary mount.

With the degree of freedom of movement provided for sun visors according to the state of the art, it is possible to position the sun visor very flexibly in relation to the desired shading of the vehicle interior. This however requires a structure which is relatively thick in the vehicle height direction. For particular applications, in particular for relatively flat roof shapes optimized aerodynamically, it is however desirable to achieve as thin a sun visor arrangement as possible so that the view angle of the driver is restricted as little as possible.

Consequently, the invention is based on the object of refining an inner shell for vehicle bodies, to which is allocated at least one flap moveable optionally between a non-usage position and a usage position, such that the flap arrangement is designed as space-saving as possible.

SUMMARY OF THE INVENTION

This invention is an inner shell for vehicle bodies formed from a foam plastic having at least one flap which can be moved optionally between a non-usage position and a usage position and vice versa. In one example, the flap preferably serves as a sun visor and/or allows access to a function element and/or cavity. The flap is formed according to the invention as part of the inner shell and its non-usage position closes essentially surface-flush with the areas of the inner shell adjacent to the flap.

As a result, the flap in its non-usage position protrudes not at all or only very slightly over the inner shell in the thickness direction so that in particular when used as a sun visor on a vehicle roof or module, it does not additionally restrict the view angle of the driver and furthermore the vehicle interior can be optimized with regard to maximum head room for the driver or passenger. Also, the measures according to the invention achieve an optically refined outer appearance of the inner shell as the flaps to be provided on the inner shell for future reasons, in their non-usage positions do not clutter undesirably, from a design aspect, the surface of the inner shell visible to the vehicle occupants. A further advantage is that, because the flap is formed as part of the inner shell, the overall structure is simplified where a part which would otherwise have to be provided to structure the inner area trim of the vehicle, namely the inner shell, has at least one further function. Not least in regard to the total weight of the corresponding body part, the solution according to the invention can be considered advantageous: because the flap is formed as part of the inner shell, no additional part increasing the overall weight is required for the flap itself, as would be the case with conventional sun visor arrangements.

In one example, the flap is suitably connected to the inner shell at one edge via a hinge. The hinge viewed in the direction of travel of the vehicle lies in front of the flap serving as a sun visor, which has the advantage that when the driver swivels the flap down from its non-usage position to shade the vehicle interior, the flap continuously narrows the view angle. However, in a conventional arrangement of the hinge in which the hinge viewed in the direction of travel of the vehicle lies behind the flap serving as a sun visor, on a swivel movement of the flap from its non-usage position to its usage position. The conventional arrangement restricts the head room and causes an extreme restriction of view angle, during which it is difficult for the driver to observe traffic conditions. In one example, the flap is formed as one piece with the inner shell, where the hinge is an advantageously simple manner is formed by a reduced-thickness section of the inner shell.

In one example, the flap on the hinge edge has side edges which in the non-usage position of the flap are separated from adjacent edges of the inner shell by separating joints which can advantageously be designed simply. Here in principle it is possible that the separating joints are formed in the surface in a center area of the inner shell (i.e., remote from the edge of the inner shell). In production terms it is simpler and at least preferable if the separating joints extend from one end of the inner shell (i.e., from its edge towards the interior of the inner shell).

In one particular example, a guide device for the swivel movement of the flap is provided, which device has complementary intermeshing arc sections which provide the guidance and are arranged centered in relation to a swivel axis of the flap. Such a guide device ensures firstly a good control sensation when the flap is swiveled out its non-usage position as the flap is not held merely by the hinge. Secondly, by suitable choice of the fit play between the arc sections of the guide device, a certain difficulty of movement of the swivel movement is achieved which depending on the relevant requirements allow the flap to be released in intermediate positions between its non-usage position and its usage position without the flap moving from its intermediate position due to its weight. In some embodiments, it is suitable for one arc section to be formed by a bearing shell foam-mounted on the flap, while the other arc section is formed by a bearing shell foam-mounted on the inner shell next to the flap, where one of the bearing shells has an arc-shaped slot which holds the arc-shaped end of the other bearing shell displaceably.

Furthermore, a retaining device can be provided for releasable fixing of the flap in its non-usage position and/or usage position, with a locking groove allocated to the non-usage position or usage position and fixed in relation to an immobile part of the inner shell, in which groove can engage a locking lug allocated to the flap. Such a retaining device can according to the relevant requirements also ensure an additional fixing of the flap in its end position so that with a relatively long flap which tends to oscillate when the vehicle is being driven, this cannot unintentionally move out of its end position. The locking grooves in one example are formed on the arc-shaped slot of the one bearing shell while the locking lug is formed on the arc-shaped end of the other bearing shell. However, although less preferably the reverse arrangement is also conceivable with locking lugs on the arc-shaped slot of the one bearing shell and a locking groove on the arc-shaped end of the other bearing shell. Also depending on the requirements, a locking intermediate position can be provided for which a suitable number of locking grooves and lugs are allocated to the respective arc sections between the locking end positions allocated to the non-usage position or usage position of the flap. Furthermore, instead of or in addition to the retaining device just described, a locking of the flap in its non-usage position is possible by means of a clip, retaining spring, locking lug or similar on the free (i.e., unhinged end of the flap), which can engage with a counter-piece of fixed location in relation to the inner shell or body.

In another example between the side edges of the flap and adjacent edges of the inner shell are provided flexible side wall sections which by moving the flap from its non-usage position to its usage position can be tensioned into an essentially triangular surface structure. When the reined flap is used as a sun visor on a vehicle roof or module, these side wall sections in the usage position of the flap advantageously prevent the lateral incidence of sunlight into the vehicle interior (i.e., the incidence of sunlight through the essentially triangular opening area) which in the usage position of the flap starting from the hinge extends in the height direction of the vehicle between the side edge of the flap and the adjacent edge of the inner shell. In an advantageously simple embodiment, these flexible side wall sections can be formed by a cover material which is in any case provided on the side of the inner shell facing the vehicle interior.

In another embodiment the flap is pretensioned in the non-usage position by means of at least one spring element which can be provided instead of or in addition to the guide or retaining device mentioned above. The spring element is required firstly for a good control sensation when swiveling the flap down or out, as the spring element here ensures a defined operational resistance. When swiveling the flap up or in, the spring element advantageously aides the operator in the swivel movement. Secondly, the spring element ensures a defined end position of the flap in the non-usage position from which the flap cannot move independently or accidentally because of the spring pretension.

According to an advantageous refinement for such a spring device, two spring elements are provided which each act on one of the flexible side wall sections, where the spring elements pretension the side wall sections and hence the flap indirectly in the non-usage position. The spring elements here advantageously ensure that the flexible side wall sections assume a defined end position when the flap is in its non-usage position. In other words, on movement of the flap from the usage position to the non-usage position, the spring elements draw out the flexible side wall sections of the separating joints between the side edges of the flap and adjacent edges of the inner shell, so that the side wall sections cannot be damaged in the separating joints or hinder the swivel movement of the flap. In one example the spring elements are angled wire sections, each with a first leg which is fixed essentially central to the side wall section concerned, and a second leg, the free end of which is mounted rotatably in a bearing block which is foam-mounted onto the flap next to the inner shell. If both the spring elements and the guide device described below are provided, the bearing block for the spring element concerned and the bearing shell, foam-mounted onto the inner shell next to flap, for the guide device can advantageously easily be made of one piece.

One example has a handle recess that is formed on one piece with the flap, which the operator can hold in order to move the flap from the non-usage position to the usage position and vice versa. Due to the one-piece design of the handle recess with the flap, no further parts such as handle shells are required with their associated additional assembly steps.

Finally, in principle it is possible to combine the inner shell described with a module part during its formation from a foam plastic, for example, by foaming the inner shell to the module part. This does not exclude producing the inner shell separately for certain applications and only later attaching this to the body part concerned with suitable fixing means. Suitable fixing means here are, e.g., described in DE 199 47 238 A1 by the Applicant and in the older German patent application 101 16 593.5 by the Applicant, to which reference is made.

The invention is described below on the basis of an embodiment example with reference to the enclosed, partly schematic drawings. These show:

BRIEF DESCRIPTION OF THE DRAWINGS

FIG. 5 is a cut-away section through the vehicle roof module according to FIG. 1, corresponding to the cut line in FIG. 4, where the cut flap serving as a sun visor is in the usage position.

FIG. 6 is a cut-away section through the vehicle roof module according to FIG. 1 in the area of a side wall section and a spring element allocated to the flap concerned, according to the cut line VI—VI in FIG. 3.

DETAILED DESCRIPTION OF THE PREFERRED EMBODIMENT

Figure 1:
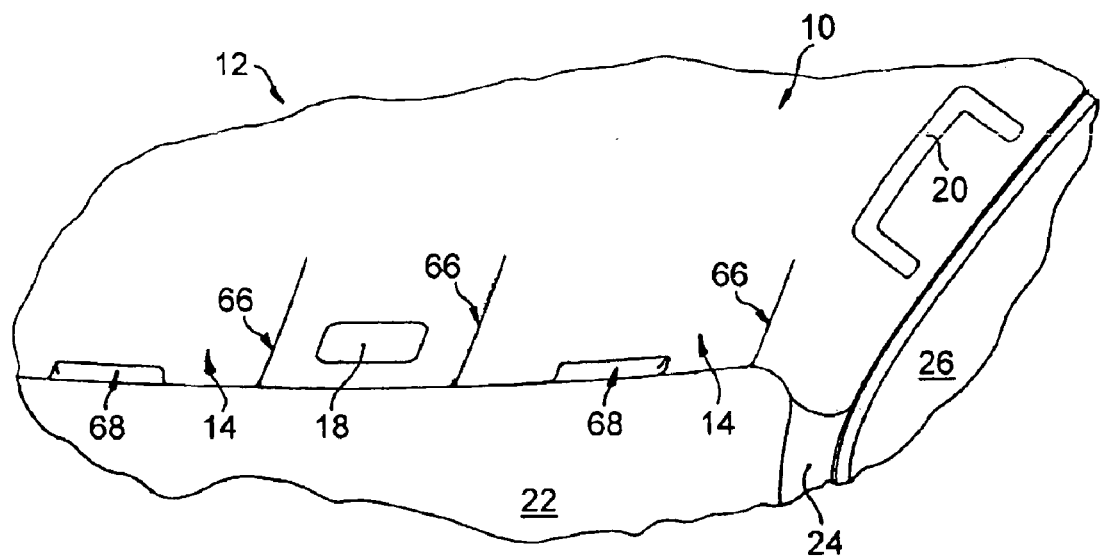
FIG. 1 is a cut-away perspective view of an inner shell of a vehicle roof module mounted on a vehicle and viewed from the vehicle interior, with flaps provided thereon which serve as sun visors and are in their non-usage positions.

The figures show an inner shell 10 formed from a foam plastic for a vehicle roof module 12 as an example of a modular part on vehicle bodies. The inner shell 10 has at least one (in the embodiment example shown two) flap 14 which can be moved optionally from a non-usage position shown in FIGS. 1, 3, 4 and 6 into a usage position shown in FIGS. 2 and 5 and vice versa. The flaps 14 serve in the embodiment example shown in sun visors, but instead or in addition can allow access to a function element (not shown) and/or a cavity 16 in the vehicle roof module 12. The flaps 14 are formed as part of the inner shell 10 and in their non-usage position close essentially surface-flush with the areas of the inner shell 10 adjacent to the flap 14 concerned, as shown in particular in FIGS. 1, 4 and 6.

Although the description below speaks throughout of a vehicle roof module, to the interior shell of which is allocated at least one flap serving as sun visor, inner shells formed according to the invention can in principle be used for all surfaces of vehicle bodies including the bonnet, doors and tailgate/boot, irrespective of whether the surface area concerned is a fixed body component or a modular part. The inside of such a component is provided in flap-like element which can optionally be opened or closed in order to allow access, e.g., to function elements on the part concerned, which can be fixing elements, locks, drive elements such as electric motors, gears or cables for window lifters, electric components, e.g., bulbs, antennae or speakers, or similar function elements. Such flaps can also close cavities which serve for example to hold sunglasses, garage door openers, etc. To this extent the application area or case of the invention described in detail is a vehicle roof module with sun visor arrangement, without this having any restrictive significance.

Figure 2:
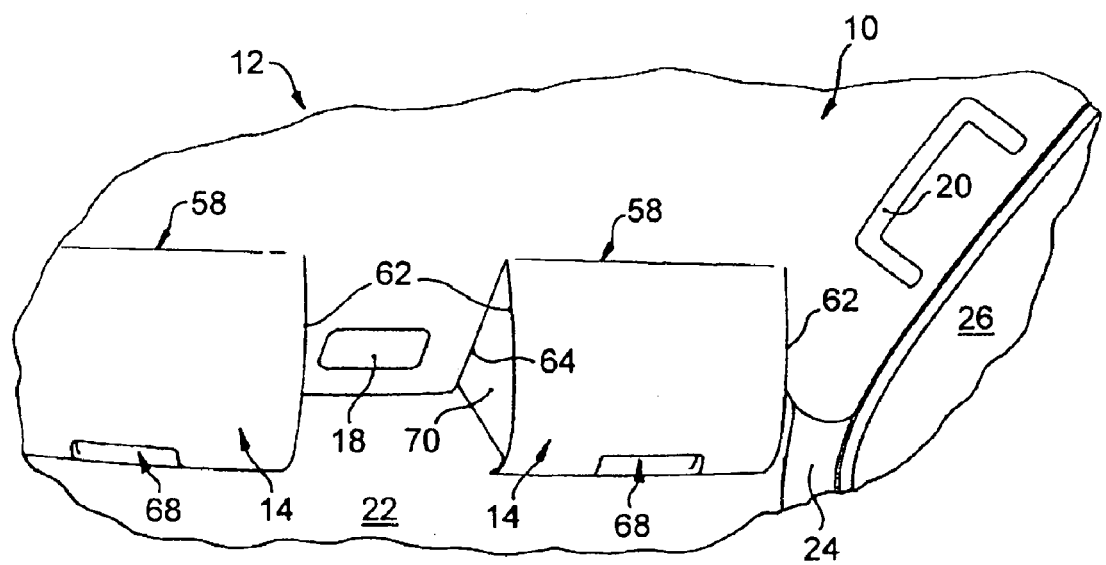
FIG. 2 is a cut-away perspective view of the inner shell according to FIG. 1 corresponding to the view in FIG. 1 in view angle and section, where the flaps serving as sun visors are in their usage positions.
Figure 3:
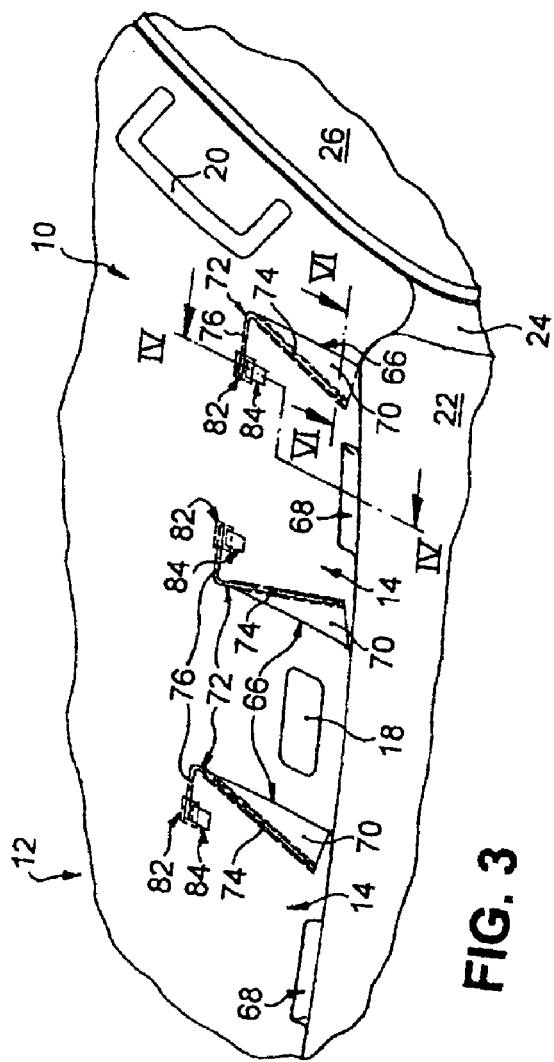
FIG. 3 is a cut-away perspective view of the inner shell according to FIG. 1 corresponding to the view in FIG. 1, where the spring elements, side wall sections and guide and retaining devices which are allocated to the flap and which cannot be seen from the vehicle interior (i.e., are covered), are indicated by dotted lines.

According to FIGS. 1 to 3, the vehicle roof module 12 comprises, as well as the inner shell 10 with the flaps 14, also a centrally arranged interior light 18 which is let into the inner shell 10 and closes essentially flush with this, and on each of its two sides handles 20 which are located in installation points comfortably accessible for the vehicle occupants. The vehicle roof module 12 is shown in the figures in a state already mounted on the body frame of the vehicle. The windscreen 22, the A-pillar 24 and a side window 26 can be seen in FIGS. 1 to 3. A front cross member 28 of the body frame is shown in FIGS. 4 to 6.

Figure 4:
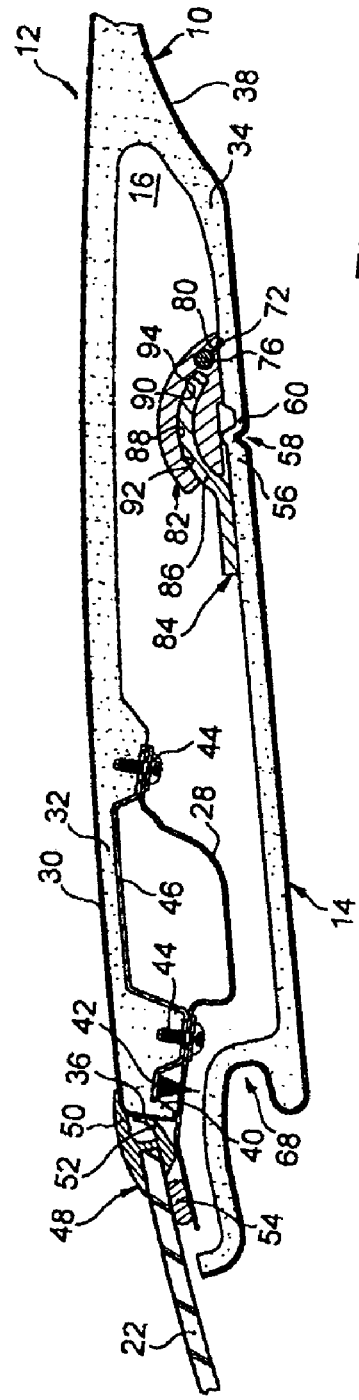
FIG. 4 is a cut-away section through the vehicle roof module according to FIG. 1 attached to the front crossbar of the vehicle body frame, according to the offset cut line IV—IV in FIG. 3, where the cut flap serving as a sun visor is in the non-usage position.

As can be gathered in particular from FIGS. 4 and 5, the inner shell 10 of the vehicle roof module 12 is formed from a foam plastic which in the embodiment example shown is foam-molded onto a rigid roof skin 30. In other words the inner shell 10 is foam-molded to the vehicle roof module 12. The rigid roof skin 30 consists of a deep-drawn metal sheet, for example aluminum sheet, or it can be made from a vacuum-molded plastic film. FIGS. 4 and 5 also show that the inner shell 10, in the area of the outer edges of the vehicle roof module 12 intended to rest on the vehicle frame, is divided into two layers 32, 34, the upper layer 32 of which is laid on the body frame while the lower layer 34 is formed of one piece with the flaps 14 as will be described in more detail below, and also serves to trim the vehicle frame. It has already been stated initially that the inner shell 10 in principle can also be produced separately from the body part and then subsequently, also where applicable releasably, attached to the body part concerned using suitable fixing means.

The upper layer 32 according to FIGS. 4 and 5 reaches up to an edge 36 of the roof skin 30. The foaming of the reinforced inner shell 10 creates a sandwich-like composite roof module of high dimensional stability and strength.

Suitable materials for the inner shell 10 are hard foam plastics that are PUR-based, which can be reinforced by fibers, for example glass fiber sections, incorporated in the plastic before foam molding. But also textiles, fabrics, fleeces and similar laid into the foam mold are suitable as reinforcements. All contours of the inner shell 10 including the lower layer 34 and its profiling are formed by corresponding shaping of the foam mold (not shown).

The inner surface of the inner shell 10 facing the vehicle interior in the embodiment example shown is coated to form a roof lining with a covering material 38 which is sufficiently flexible to adapt to the inner surface of the inner shell 10. The covering material 38 ensures that the inner shell 10 can easily be adapted to the requirements with regard to the external appearance (color, material) of the other interior trim of the vehicle. Thus, the covering material 38 can consist of a flat textile fabric, leather synthetic leather or suede or a decorative plastic film depending on the design requirement concerned.

In the area of the support on the body frame the upper layer 32 of the inner shell 10 has peripheral molded holding grooves 40 in which are held the adhesive beads 42 sealing the vehicle roof module 12 to the body frame and shown purely diagrammatically in FIGS. 4 and 5. The beads also serve to attach the vehicle roof module 12 to the body frame. However, in the embodiment example shown, the main part of the fixing is provided by fixing bolts 44 which are arranged at least on the front edge of the vehicle roof module 12 in the direction of travel and penetrate from below through allocated fixing holes in the front cross member 28 of the body frame and are screwed into threaded bores formed in a metal profile 46 foamed onto the upper layer 32. FIG. 5 shows that the fixing bolts 44 are easily accessible from the vehicle interior when the flaps 14 are in their usage position.

As can be further gathered from FIGS. 4 and 5, on an edge of the windscreen 22 an elastomer sealing profile 48 lies with a projecting outer lip 50 sealing on the outer surface of the roof skin 30, while a projecting inner lip 52 of the sealing profile 48 lies sealing on the rim edge 36 of the roof skin 30. Between the windscreen 22 and an outwardly projecting flange of the front cross member 28 of the body frame, a further adhesive bead 54 fixes and seals the windscreen 22 on the vehicle body.

According to FIGS. 4 and 5, the flap 14 is formed as one piece with the lower layer 34 of the inner shell 10. The flap 14 is connected, at its right-hand or upper edge 56 in FIGS. 4 and 5, respectively, articulated via a hinge 58 with the part of the lower layer 34 of the inner shell 10 on the right in these figures. The flap 14 in the illustrated example embodiment is shown lying in front of the hinge 58 viewed in the direction of travel of the vehicle and serving as a sun visor. The example hinge 58 is a film hinge along a reduced thickness section 60 of the lower layer 34 of the inner shell 10. Such a reduced thickness section 60 can easily be produced by corresponding projections in the foam mold (not shown). The side edges 62 of the flap 14 next to the upper edge 56, as shown in particular in FIG. 6, in the non-usage position of flap 14 are separated from adjacent edges 64 of the lower layer 34 of the inner shell 10 by separating joints 66. The separating joints 66, extending starting from the free end of the inner shell 10 or lower layer 34 to the hinge 58, can easily be formed by suitable projections in the foam mold (not shown). The same applies to a handle recess 68 formed of one piece with the flap 14 and located at the free end of the flap 14.

As can be seen from FIGS. 2 and 6, between the side edges 62 of the flap 14 and the adjacent edges 64 of the lower layer 34 of the inner shell 10 are provided flexible side wall sections 70 which by movement of the flap 14 from its non-usage position to its usage position can in each case be tensioned into a flat essentially triangular structure according to FIG. 2 which provides additional shading of the vehicle interior and prevents a side view into the cavity 16. In the embodiment example shown the side wall sections 70 are also formed by the covering material 38 on the face of the inner shell 10 on the side facing the vehicle interior. Here however also a design is conceivable in which the side wall sections 70 are formed by additional fabric or film sections which are suitably attached to the side edges 62 of the flap 14 and the adjacent edges 64 of the lower layer 34, for example by means of an adhesive.

As FIGS. 3 to 6 show, on the side of each flap 14 facing away from the vehicle interior, in the vicinity of each flap side edge 62 is provided a spring element 72 so that two spring elements 72 are allocated to each flap 14. The spring elements 72 each act on one of the side wall sections 70, whereby the spring elements 72 pretension the side wall sections 70 and hence also the respective flap 14 in the non-usage position. More precisely, in the example embodiment shown, the spring elements 72 are simply angled wire sections which each have a longer first leg 74 and a shorter second leg 76. The first leg 74 of the spring element 72 according to FIGS. 3 and 6 is fixed essentially centrally on the side wall section 70 by means of at least one fabric loop 78 surrounding the first leg 74 and suitably attached (e.g., by gluing and/or sewing to the relevant side wall section 70). The free end of the second leg 76 of the spring element 72 in contrast, according to FIGS. 4 and 5, is mounted rotatably in a bearing block 80 which is formed of one piece with a bearing shell 82 to be described in more detail below which is foam-molded onto the lower layer 34 of the inner shell 10 next to the flap on the side facing away from the vehicle interior.

It is evident that, when the flap 14 is swiveled from its non-usage position to its usage position, the spring elements 72 are spring outward in relation to the flap 14 via the three tensioning side wall sections 70 which pull the first legs 74 of the spring elements 72 via the fabric loop 78. When the flap 14 is moved back from its usage position to its non-usage position, the spring elements 72 springing back support the swivel movement as their first legs 74 pull via the fabric loops 78 on the side wall sections 70 and hence the flap 14, where the side wall sections 70 are also drawn away from the separating joint 66 inwards in relation to the flap 14. In the non-usage position of the flap 14, the side wall sections 70 and spring elements 72 then come to lie immediately above the flap 14 as shown in FIG. 6. In the embodiment example shown the hinge 58 and the aligned axes of rotation of the second leg 76 of the spring element 72 in their allocated bearing blocks 80 do not lie on a common axis. In the swivel movement of the flap 14 however where applicable compensation movements of the components concerned are possible due to a certain flexibility of the hinge 58 and the elasticity of the spring elements 72.

Furthermore, in the example embodiment shown, a guide device shown in FIGS. 4 and 5 is provided for the swivel movement of the flap 14 concerned, which device has complementary inter-engaging arc sections providing the guidance of the flap 14 and arranged centered in relation to the swivel axis of the flap 14. More precisely on both short sides of the flap 14, a bearing shell 84 is foam-mounted on flap 14 next to the hinge 58 on the side of flap 14 facing away from the vehicle interior, where an arc-shaped end 86 stretches away from each bearing shell 84 and forms one of the arc sections. The other arc sections are formed by arc-shaped slots 88 which are provided in bearing shells 82 foam-mounted in the lower layer 34 of the inner shell next to the flap 14. As FIGS. 4 and 5 show, the arc-shaped ends 86 of the flap-side bearing shells are displaceable and held essentially without radial play in the arc-shaped slots 88 of the bearing shells 82 on the inner shell side.

The bearing shells 82, 84 preferably made of a suitable plastic also form a holding device for releasable attachment of the flap 14 in its non-usage position and/or usage position as will be described below. This retraining device on both short sides of the corresponding flap 14 has two locking grooves 90 92, of which the one locking groove 90 is allocated to the non-usage position of the flap 14 (FIG. 4) while the other locking groove 92 is allocated to the usage position of the flap 14 (FIG. 5). As FIGS. 4 and 5 also show, the locking grooves 90, 92 are suitably designed with an angular offset to the arc-shaped slot 88 of the respective bearing shell 82, i.e., the locking grooves 90, 92 in the embodiment example shown are fixed in relation to the immobile part of the inner shell 10. Finally, the retaining device on both short sides of the corresponding flap 14 has a locking lug 94 which can engage in the locking grooves 90, 92 on the arc-shaped slot 88 of the bearing shell 82 concerned and on the end is shaped to the arc-shaped end 86 of the respective bearing shell 84.

It is evident that the guide device described allows a guided or defined swivel movement about the swivel axis of the flap 14, while it essentially prevents angular movements of the flap 14 in the flap plane and translatory height movements of the flap 14. Translatory transverse movements of the flap 14 however are essentially prevented by the hinge 58. The retraining device described ensures defined end positions of the flap 14 in its non-usage and usage positions respectively, where the retaining device holds the flap 14 in its usage position against the force of the spring elements 72.

It has already been stated initially that depending on the requirements, instead of or in addition to the retaining device described, a locking or the flap 14 is possible in its non-usage position by means of a clip, retaining spring, locking lug or similar (not shown) on the free end (i.e., unhinged, left-hand in FIG. 4) of the flap 14, which can be locked to a counter-piece fixed in relation to the inner shell 10 or the body, e.g., a locking groove (not shown) or a tongue of the front cross piece 28.

An inner shell formed from foam plastic for vehicle bodies, in particular a vehicle roof or vehicle roof module, is disclosed to which is allocated at least one flap which can be moved optionally from a non-usage position to a usage position and vice versa. Preferably the flap serves as sun visor and/or allows access to a function element and/or cavity. According to the invention the flap is formed as part of the inner shell and in its non-usage position closes essentially surface-flush with the areas of the inner shell adjacent to the flap. The result is a very space-saving design of flap arrangement.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A modular vehicle body component comprising:

a rigid outer skin presenting an exterior surface for the body component;

a foam plastic layer molded onto the rigid outer skin, the foam plastic layer having at least one flap that is selectively movable between a first position where the flap is essentially flush with surrounding portions of the foam plastic layer adjacent the flap and a second position where at least one end of the flap extends away from the surrounding portions; and including a hinge at one edge of the flap, wherein the flap extends between the hinge and an edge of the foam plastic layer.

2. The modular vehicle body component of claim 1, wherein the flap is formed as one piece with the foam plastic layer and wherein the hinge comprises a reduced thickness section of the foam plastic layer.

3. The modular vehicle body component of claim 1, wherein the foam plastic layer and the flap comprise the same material and there is a continuous, unbroken surface extending between the flap and an adjacent portion of the foam plastic layer and wherein the hinge comprises a reduced thickness section of the foam plastic layer.

4. A modular vehicle body component comprising:

a rigid outer skin presenting an exterior surface for the body component;

a foam plastic layer molded onto the rigid outer skin, the foam plastic layer having at least one flap that is selectively movable between a first position where the flap is essentially flush with surrounding portions of the foam plastic layer adjacent the flap and a second position where at least one end of the flap extends away from the surrounding portions; and wherein the flap has side edges that are separated from adjacent edges of the foam plastic layer by separating joints when the flap is in the first position.

5. The modular vehicle body component of claim 4, wherein the separating joints extend from an edge of the foam plastic layer to a hinged connection between the flap and an adjacent portion of the foam plastic layer.

6. An inner shell for use as part of a vehicle body component, comprising:

a foam plastic layer having at least one flap that is moveable between a first position where the flap is essentially flush with the surface of adjacent areas of the inner shell and a second position where at least one end of the flap is spaced away from the adjacent areas on each side of the flap; and a guide device that facilitates movement of the flap, the guide device having complementary, inter-engaging arc sections.

7. The inner shell of claim 6, wherein the flap is moveable about a swivel axis relative to a remainder of the foam plastic layer and the guide device is centrally located along the swivel axis.

8. The inner shell of claim 6, wherein one of the inter-engaging arc sections of the guide device is secured to the flap and a complementary one of the inter-engaging arc sections is secured to an adjacent portion of the foam plastic layer and wherein one of the inter-engaging arc sections includes an arc-shaped slot that receives an arc-shaped end of the other inter-engaging arc section such that the arc-shaped end is moveable relative to the arc-shaped slot.

9. An inner shell for use as part of a vehicle body component, comprising:

a foam plastic layer having at least one flap that is moveable between a first position where the flap is essentially flush with the surface of adjacent areas of the inner shell and a second position where at least one end of the flap is spaced away from the adjacent areas on each side of the flap; and a retaining device for releaseably maintaining the flap in the first position having a locking groove fixed relative to an immobile part of the inner shell and including a locking lug associated with the flap, the locking lug being selectively received in the locking groove to maintain the flap in the first position.

10. An inner shell for use as part of a vehicle body component, comprising:

a foam plastic layer having at least one flap that is moveable between a first position where the flap is essentially flush with the surface of adjacent areas of the inner shell and a second position where at least one end of the flap is spaced away from the adjacent areas on each side of the flap; and a retaining device for releaseably maintaining the flap in the second position having a locking groove fixed relative to an immobile part of the inner shell and including a locking lug associated with the flap, the locking lug being selectively received in the locking groove to maintain the flap in the second position.

11. An inner shell for use as part of a vehicle body component, comprising:

a foam plastic layer having at least one flap that is moveable between a first position where the flap is essentially flush with the surface of adjacent areas of the inner shell and a second position where at least one end of the flap is spaced away from the adjacent areas on each side of the flap; and flexible side wall sections extending between edges of the flap and adjacent edges of the foam plastic layer when the flap is in the second position.

12. The inner shell of claim 11, wherein the flexible side wall sections comprise a covering material that extends over a substantial portion of the foam plastic layer on a side adapted to face a vehicle interior.

13. The inner shell of claim 11, including spring elements associated with the flexible side wall sections, the spring elements biasing the flap into the first position.

14. The inner shell of claim 13, wherein the spring elements comprise angled wire sections having a first leg essentially fixed centrally on a corresponding one of the flexible side wall sections and a second leg that is at least partially rotatably mounted on an adjacent portion of the inner shell near the flap.

15. The inner shell of claim 14, including a mounting element that supports the second leg and a guide device supported by the mounting element.

16. A modular vehicle body component comprising:

a rigid outer skin presenting an exterior surface for the body component;

a foam plastic layer molded onto the rigid outer skin, the foam plastic layer having at least one flap that is selectively movable between a first position where the flap is essentially flush with surrounding portions of the foam plastic layer adjacent the flap and a second position where at least one end of the flap extends away from the surrounding portions; and including a handle recess formed on the flap.

* * * * *